Aug. 5, 1958 W. L. HENDERSHOT 2,846,158

TAPE STORAGE DEVICE AND SPOOLING APPARATUS FOR LOADING THE SAME

Filed May 10, 1955

INVENTOR.
William L. Hendershot

BY

Earl D. Ayers
AGENT

United States Patent Office 2,846,158

Patented Aug. 5, 1958

2,846,158

TAPE STORAGE DEVICE AND SPOOLING APPARATUS FOR LOADING THE SAME

William L. Hendershot, Midland, Mich.

Application May 10, 1955, Serial No. 507,411

2 Claims. (Cl. 242—55)

This invention relates to apparatus for depositing lengths of tape in cup like storage containers and particularly to such apparatus which is adapted to be used in conjunction with Teletype equipment of the automatic transmitter distributor type.

In many commercial organizations orders for materials are often transmitted from sales offices to shipping points, production plants, etc. via teletype communications systems in order to expedite processing of the orders. Much of the information to be supplied via Teletype to the shipping unit is repetitive in nature. For example, in handling orders of a specific company the shipping route, discount or sales basis, complete address of the customer, credit standing, special shipping instructions as to packaging required, etc. may be used in connection with all or most of the orders which are to be shipped to that company. Customarily this repetitive type of information is placed on a coded tape which is filed under the company name and is available for use whenever needed.

The filing of such "repeat order information" tapes presents a considerable problem. One manner of filing the tapes which is widely used involves the folding of the tape back and forth upon itself and depositing the tape in an envelope which bears the customer's name. The envelope is then filed according to any conveniently indexed filing system. The folding of the tape, however, weakens it, and after being unfolded, used, and refolded a few times the tape is often subject to tearing and must be replaced.

Accordingly, a principal object of this invention is to provide improved storage means for lengths of tape.

Another object of this invention is to provide improved tape spooling apparatus which may be coupled to an automatic transmitter distributor and which is adapted for use with a quick detachable tape storage device.

A further object of this invention is to provide an improved tape storage means which may be easily filed, is rugged but not bulky, in which the tape may be easily loaded and unloaded, and which is economical to manufacture.

In accordance with this invention there is provided tape spooling apparatus including a tape receiving guide having a flared tape receiving end and a discharge end which directs the tape into the interior of a cup-like spool. The spool is held in a freely revolvable spool retainer and positioner by magnetic attraction. The spool retainer and positioners and the film guide are secured in predetermined spatial relationship with respect to each other.

The invention itself, as well as additional objects and advantages thereof, will best be understood when the following detailed description is read in connection with the accompanying drawings, in which.

Figures 1, 2:
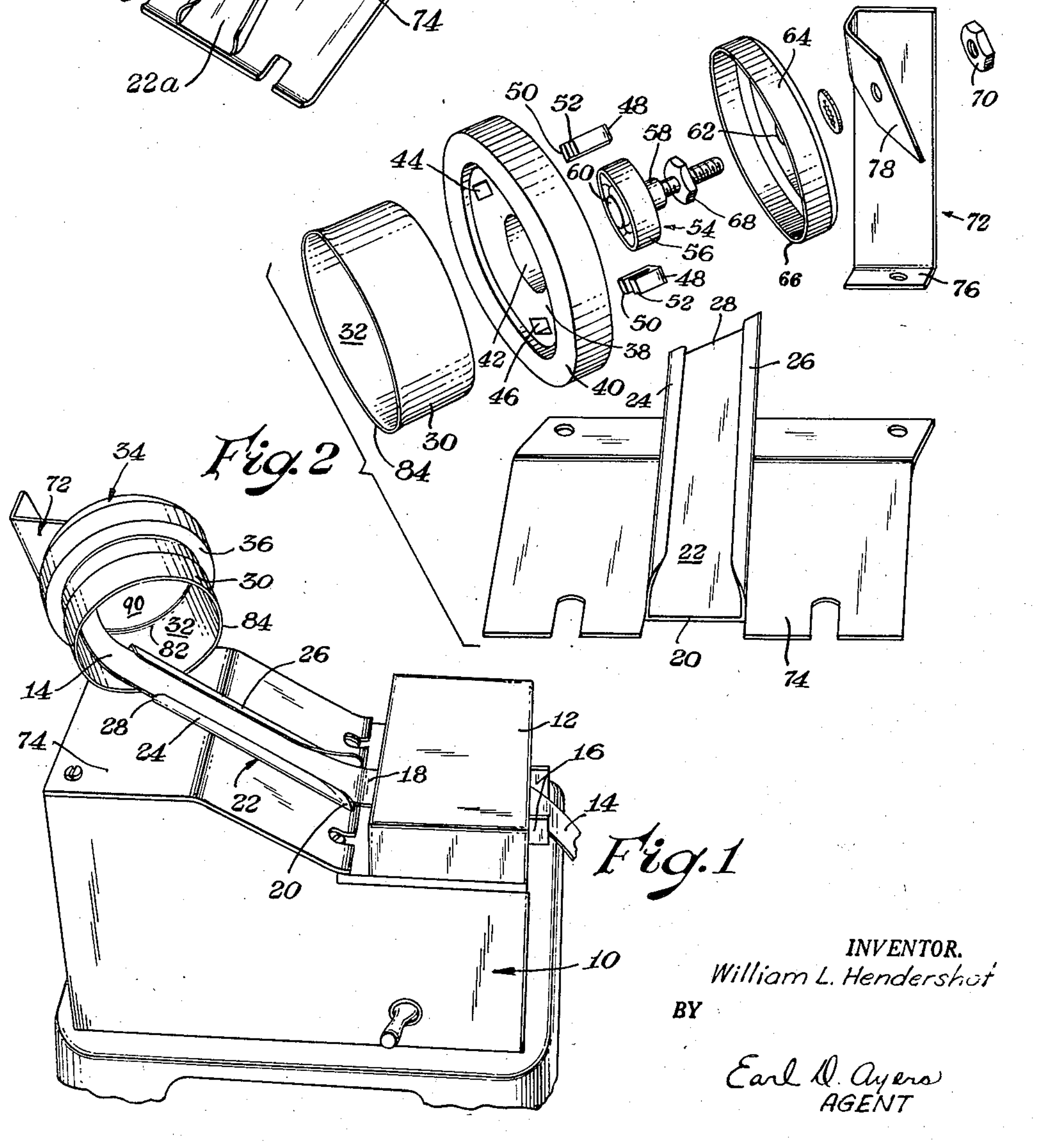
Fig. 1 is a perspective view of automatic transmitter distributor apparatus incorporating one embodiment of tape winding apparatus made in accordance with this invention.
Fig. 2 is an exploded isometric view, on an enlarged scale, of the tape winding apparatus shown in Fig. 1.

Referring to Fig. 1, there is shown an automatic transmitter distributor 10 of the type used in connection with Teletype communications equipment. The tape advancing and sensing mechanism is disposed under the cover 12, the tape 14 being fed into the distributor 10 through the side guides 16 and emanating from the distributor on the other side 18 of the cover 12. The flared end 20 of a tape guide 22 is closely spaced from the part of the side 18 from which the tape 14 is expelled and is so aligned with respect to the tape that tape ends tend to enter the guide. The tape receiving guide 22 has a width dimension which is greater than the width of the tape 14 to be passed therethrough and has inwardly extending tape retainers 24, 26 along each upper sides of the guide. The tape retainers may be integral with the remainder of the guide 22 or may be separately made and then attached to the remainder of the guide. As shown in Figs. 1 and 2, the tape retainers 24, 26 are opened upwardly at the tape receiving end 20 to provide a more advantageous tape receiving opening.

The flared tape receiving end 20 of the tape guide 22 is generally perpendicular with respect to the longitudinal axis of the guide 22 while the discharge end 28 of the guide 22 is shaped diagonally with respect to the longitudinal axis of the guide. The "long" side of the guide 22 along tape retainer 26 is the side of the guide which is closest to a tape storage spool 30.

Referring to Fig. 2 as well as to Fig. 1, the tape storage spool 30 is disposed obliquely with respect to the tape guide 22 and is so ailgned with respect thereto that tape 14 feeding into the spool 30 from the discharge end 28 of the tape guide 22 extends into the spool 30 and threads itself around the inner peripheral surface 32 of the spool 30. The spool 30, as illustrated, is a cup-like steel member which may be made by drawing or stamping and then trimming to shape, for example. Alternatively, the tape receiving spool may be made of cardboard, plastic, or other material which is capable of retaining its form after considerable handling. The only additional requirement is that some predetermined part of the spool cup 30 which contacts the spool retainer and positioner, indicated generally by the numeral 34, be capable of being magnetically attracted to the spool retainer and positioner. If the spool 32 is not itself made of a magnetic material, a magnetically attractable material may be added, as a painted surface, a magnetic adhesive tape, or an insert of steel, for example. The steel spool as illustrated, however, has proven rugged and cheap to manufacture and thus makes an excellent spool for the purpose.

The spool retainer and positioner 34 is a multi-part member comprising an annular disc 36 conveniently made of a nonmagnetic material, a plastic such as Lucite, for example, which contains a shallow bore 38 extending inwardly from the spool receiving side 40 of the member. The bore 38 is concentric with the center of the disc 36 and of slightly larger diameter than the outer diameter of the spool 30. A second concentric bore 42 extends into the plastic disc from the side opposite the shallow large diameter bore 38. Although the bore 42 is illustrated in Fig. 2 as extending through the disc 36, it may advantageously be drilled only part way through the disc in order to protect the bearing which is inserted therein from dust and grit. Two rectangularly shaped cutouts 44, 46 extend through the disc 36 and are symmetrically disposed on opposite sides of the bore 42. A small horse shoe shaped magnet 48, the Alnico type being an example of a suitable kind, is inserted into each cutout 44, 46 and is retained there with its pole pieces 50, 52 flush with or slightly depressed below the bottom surface of the bore 38 on the spool receiving side 42 of the disc 36. The magnets 48 may be retained in the cutouts 44, 46 by means of a press fit, cement, set screws, or other convenient means.

A roller or ball bearing, indicated generally by the numeral 54, having an outer race 56 of substantially the same outer diameter as the bore 42 is secured within the bore 42 by a press fit or any other convenient means which will preserve the concentricity of the bearing 54 within the bore 42. A shaft 58 extends through the inner race 60 of the bearing 54 and is affixed thereto in any convenient manner (keyed or press fitted thereto, for example). The shaft 58 extends from the bearing 54 and passes through a bore 62 in a cup like cover 64 whose rim 66 lies closely adjacent to the rear surface of the spool retainer and positioner disc 36. The cover 64 protects the bearing 54 and magnets 48 from mishandling by operating personnel and also serves to protect the bearing 54 from dirt and grit which might otherwise soon affect the smooth operation of the bearing. The cover 64 is held slightly away from the disc 36 by stop means such as the nut 68 on the threaded shaft 58, and may be fixed in its operating position by a nut on the shaft 58 which is on the opposite side of the cover bottom than the stop means nut 68. The bore 62 in the cover bottom should be centrally disposed therein and should be only slightly larger in size than the diameter of the shaft 58 if the cover 64 is to be mounted symmetrically with respect to the disc 36 without the need of centering jigs when the parts are assembled. In practice the nut 70 which is used to hold the cover 64 in position is often the nut used to secure the spool retainer and positioner 34 to its mounting bracket which is indicated generally by the numeral 72. The mounting bracket 72 is made of sheet metal strip material and extends upwardly from the base plate 74 to which it is affixed along its lower bent end 76. (The tape guide 22 is also affixed to the plate 74.) A side arm 78 of the bracket 72 extends from near the top end 80 of the bracket and is bent and tilted to provide the desired angular relationship and spacing with respect to and between the tape guide 22 and the spool retainer and positioner 34. The side arm 78 is bent so that the long side of the tape guide points towards the bottom (inner) edge 82 of the side wall of the spool 30. The short side of the tape guide 22 points generally towards the outer or rim edge 84 of the spool 30.

In operation the tape 14 is expelled from the distributor 10 and enters the tape guide 22. The tape 14 passes freely through the guide 22 and strikes the inner peripheral surface 32 of the spool 30. The tape enters the spool 30 at a small acute angle with respect to the bottom of the spool. Friction between the tape 14 and wall or inner peripheral surface 32 of the spool 30 causes the rotation of the spool retainer and positioner 34 to which the spool 30 is magnetically coupled by means of the horse shoe shaped magnet 48 and the metal bottom 90 of the spool. As the tape 14 is expelled from the distributor it is then coiled inside the spool without the application of external force except for the final end of the tape which remains in the channel of the tape guide 22 after the tape 14 leaves the tape advancing mechanism of the distributor 10. To coil the final bit of tape 14 within the spool 30 the disc 36 is spun manually by the equipment operator who is normally in a position to observe the operation of the equipment.

Both chadded and chadless perforated tapes as well as unperforated tapes may be spooled in the above described manner. While the apparatus of the invention has been described as being mounted on a mounting plate 74 which replaces the regular top plate of the distributor 10, the apparatus may be mounted completely separately from the distributor so far as mechanical support thereto is concerned. The distance between the spool and the distributor should be kept short, however, to minimize friction between the tape 14 and the tape guide 22 which would tend to restrict the smooth driving of the tape 14 through the guide 22. The guide 22 may be made of metal or of any material which will retain the desired shape, but metal guides have proven best in use tests because large static charges do not build up on the apparatus when metal parts are used.

To install a spool 30 in the spool retainer and positioner 34 the rim edge 84 of the spool 30 is slipped over the discharge end 28 of the tape guide 22 and the bottom 90 of the spool 30 is seated within the shallow bore 38 in the disc 36 and held there by the magnetic attraction of the magnets 48 for the metal spool can 30. When tape 14 which has been coiled in a spool 30 is to be used to process an order, a slight shaking of the spool usually dislodges the tape 14 which, though snugly coiled therein, falls out easily under impact.

Figure 3:
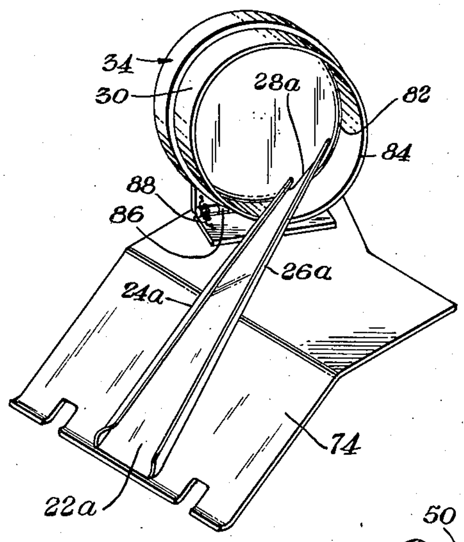
Fig. 3 is an isometric view of an alternative embodiment of tape winding apparatus in which the spool retainer and positioner and mounting bracket is hinged at its base to permit easier loading and removal of the tape receiving spool.

In the spooling apparatus shown in Fig. 3 the tape guide **22*a* is twisted counterclockwise as it leaves the flared input end 20*a* and is adapted to feed tape 14 into a spool 30 held in a spool retainer and positioner 34 which is similar to the one used in the apparatus of Figs. 1 and 2. The mounting bracket for the spool retainer and positioner is hinged, however, as by the piano type hinge 86. The spool retainer and positioner may thus be loaded or unloaded while the spool retainer and positioner member 34 is held in a horizontal position. When the spool 30 is inserted, the member 34 is then allowed to spring upwardly with the spool 30 in position. The spring 88 is provided for inducing the spool holding member 34 to return to vertical position after the spool 30 is in place. This manner of loading or unloading the spool 30 in the apparatus obviates the need for fitting the rim 84 of the spool 30 around the discharge end 28 of the tape guide before installing or removing the spool. While the spool retainer and positioner 34** has been illustrated as being on the left side of the tape guide in Fig. 3, this is a matter of convenience and may be changed to suit particular mounting requirements.

Another convenient way to permit the easy insertion of the spool 30 into the spool retainer and positioner 34 is to mount the tape guide 22 in a swivelled manner, the swivel point being disposed near the center of the guide 22. In this manner the guide 22 could be held away from the spool retainer and holder while a spool is being inserted or withdrawn therefrom. A flexible guide 22 might also be used to accomplish the same purpose.

In event it is desired to use the tape spooling apparatus of the invention when a tape driving unit such as a distributor 10 is not available, a small synchronous motor such as a clock motor having a friction drive wheel attached to its rotor may be incorporated into the apparatus and pivotally mounted on the plate 74 so that the drive wheel will fall between the tape retainers 24, 26 of the guide chute 22 when tape driving force is needed.

What is claimed is:

1. Tape spooling apparatus comprising a tape guide having a tape input end, a tape discharge end and a tape channel therebetween, said channel being wider than the tape which is to pass therethrough, a tape receiving cup-like spool having a rim, side wall and bottom, said bottom having included therein a magnetic material, and a freely rotatable spool retainer and positioner adapted to receive and hold said spool, said spool retainer and positioner including a disc of non magnetic material whose diameter exceeds the diameter of the spool, said disc having a shallow bore in the side therof which faces said spool, the diameter of the shallow bore being slightly larger than the diameter of spool near the bottom thereof, the bore being so dimensioned that the bottom part of the cup-like spool fits closely but freely within the bore, a second bore extending into said disc from the side opposite the shallow bore side, said shallow bore and said second bore each being concentric with the disc, a pair of cutouts extending through said disc, said cutouts being disposed symmetrically and on opposite side of the second bore, the cutouts opening into the bottom of the shallow bore, a magnetic element in each cutout, each element having a pole piece facing the bottom of the shallow bore, a bearing disposed in and secured to the second bore, a shaft extending from said bearing on the side of said disc opposite to said shallow bore, a mounting bracket, means securing said shaft to said mounting bracket, said mounting bracket and said tape guide being so disposed in predetermined spatial relationship that when a spool is in place in said spool retainer and positioner the discharge end of said tape guide is adjacent to but spaced from said spool and is so aligned with respect to the spool that tape emanating from the tape guide strikes the wall of the spool at a small acute angle with respect to the bottom of the spool.

2. Tape spooling apparatus in accordance with claim 1, wherein a cup-like cover is provided for the side of said disc from which said shaft extends, said cover being secured to said shaft and having its rim edge slightly spaced from said disc.

References Cited in the file of this patent

UNITED STATES PATENTS

| | | |
|---|---|---|
| 765,650 | Casgrain | July 19, 1904 |
| 2,220,481 | Fritts | Nov. 5, 1940 |
| 2,262,032 | Moore | Nov. 11, 1941 |
| 2,297,525 | Anheuser | Sept. 29, 1942 |
| 2,527,391 | Blais | Oct. 24, 1950 |
| 2,608,357 | Brearton | Aug. 26, 1952 |
| 2,746,691 | Hoad | May 22, 1956 |

FOREIGN PATENTS

| | | |
|---|---|---|
| 588,188 | Great Britain | May 16, 1947 |